Figure 10:
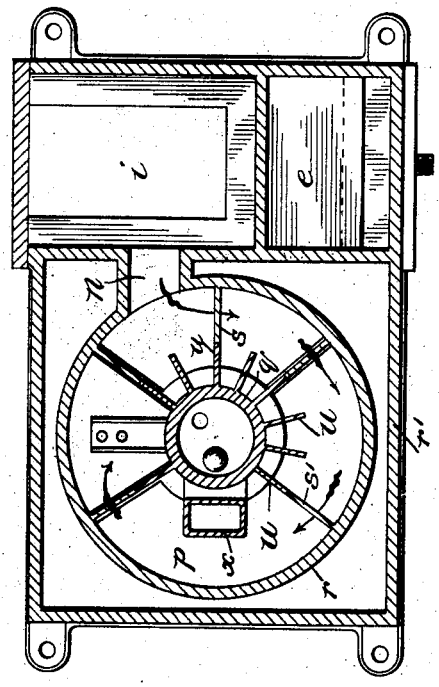

No. 761,448. PATENTED MAY 31, 1904.
T. & W. L. COLE.
E. A. COLE, EXECUTRIX OF T. COLE, DEC'D.
APPARATUS FOR PRODUCING COLD AIR FOR REFRIGERATING PURPOSES.
APPLICATION FILED JULY 22, 1901.
NO MODEL. 5 SHEETS—SHEET 1.
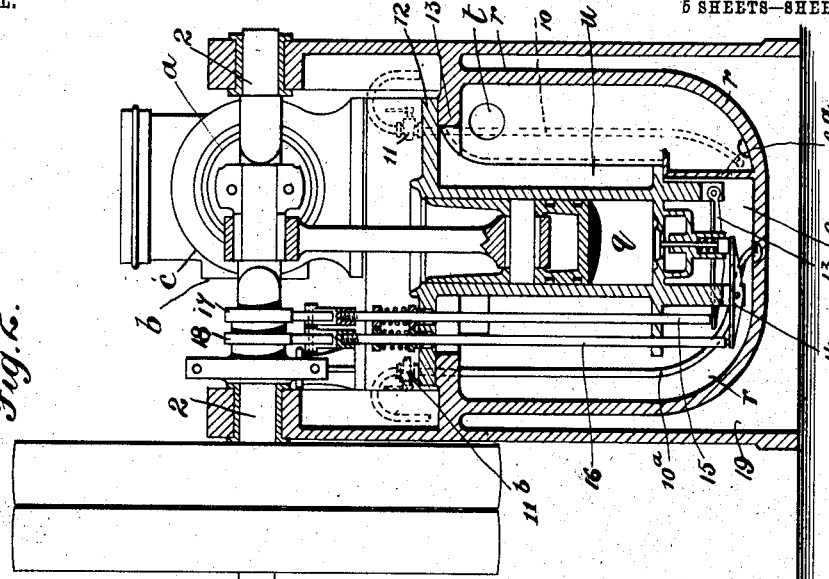
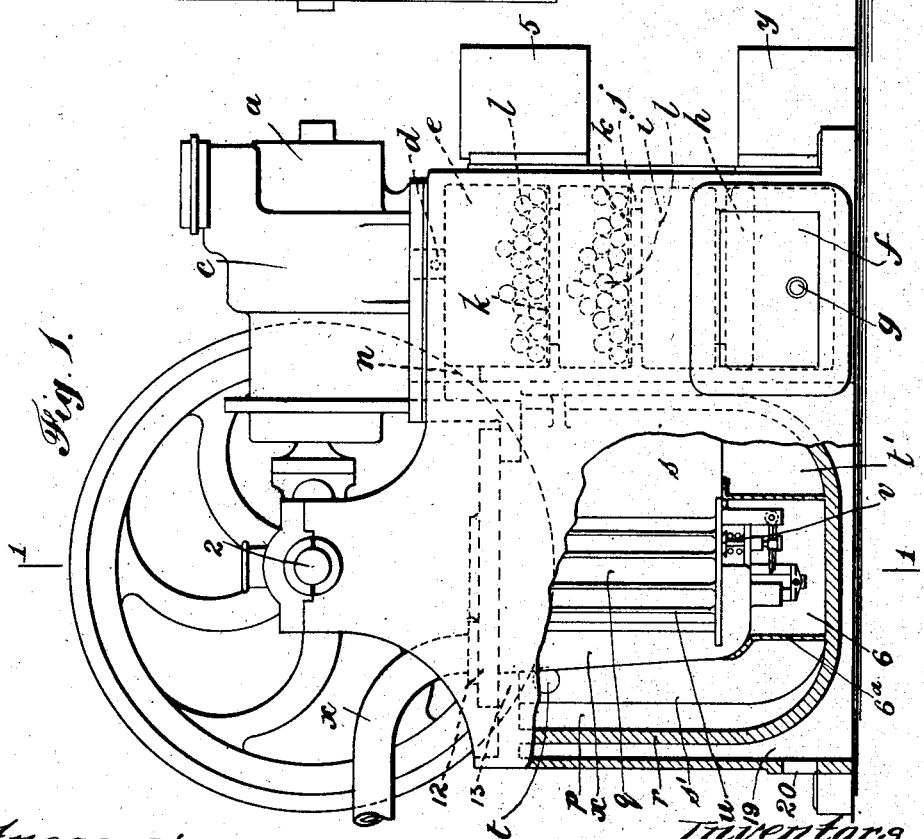
Witnesses:
Inventors
Thomas Cole
William L. Cole
By James L. Norris
Atty No. 761,448. PATENTED MAY 31, 1904.
T. & W. L. COLE.
E. A. COLE, EXECUTRIX OF T. COLE, DEC'D.
APPARATUS FOR PRODUCING COLD AIR FOR REFRIGERATING PURPOSES.
APPLICATION FILED JULY 22, 1901.
NO MODEL. 5 SHEETS—SHEET 2.
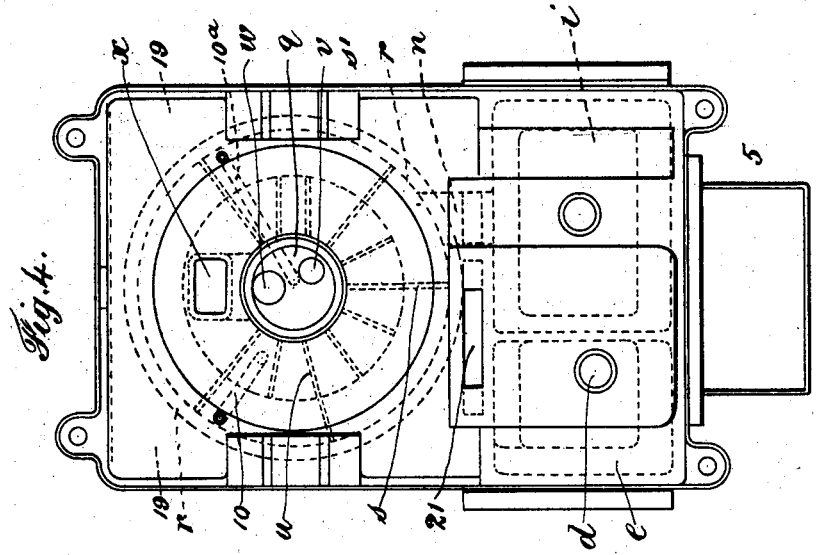
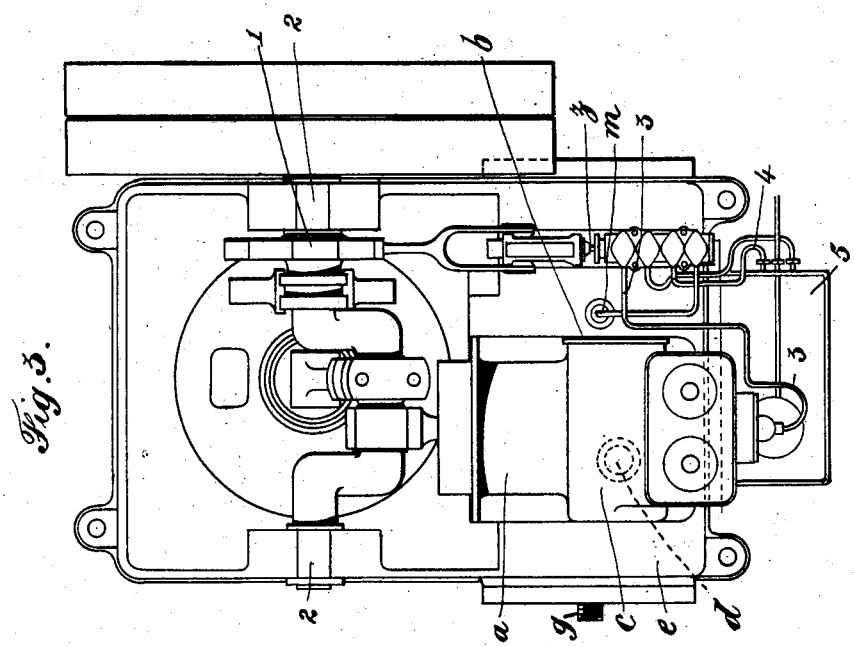
Witnesses:
Inventors
Thomas Cole
William L. Cole
By James L. Norris
Atty No. 761,448. PATENTED MAY 31, 1904.
T. & W. L. COLE.
E. A. COLE, EXECUTRIX OF T. COLE, DEC'D.
APPARATUS FOR PRODUCING COLD AIR FOR REFRIGERATING PURPOSES.
APPLICATION FILED JULY 22, 1901.
NO MODEL. 5 SHEETS—SHEET 3.
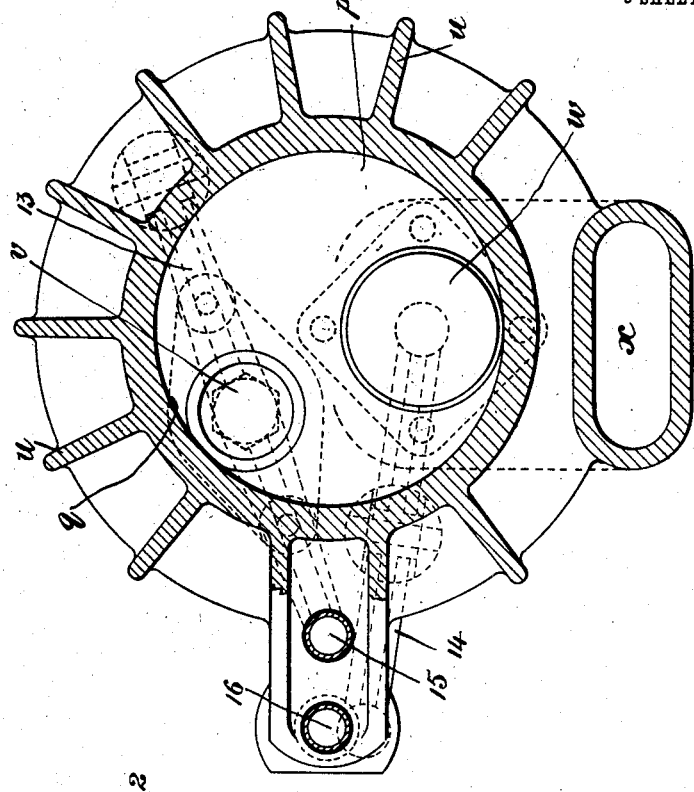
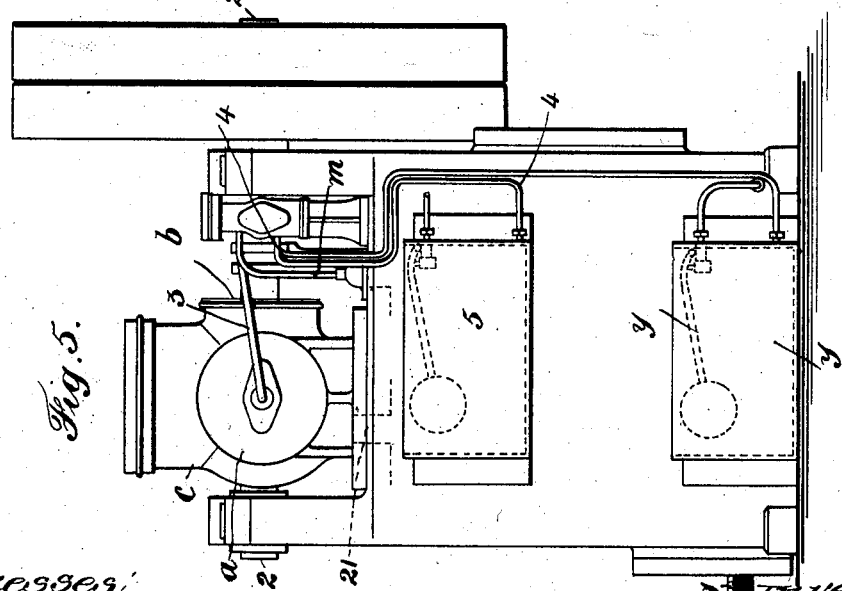

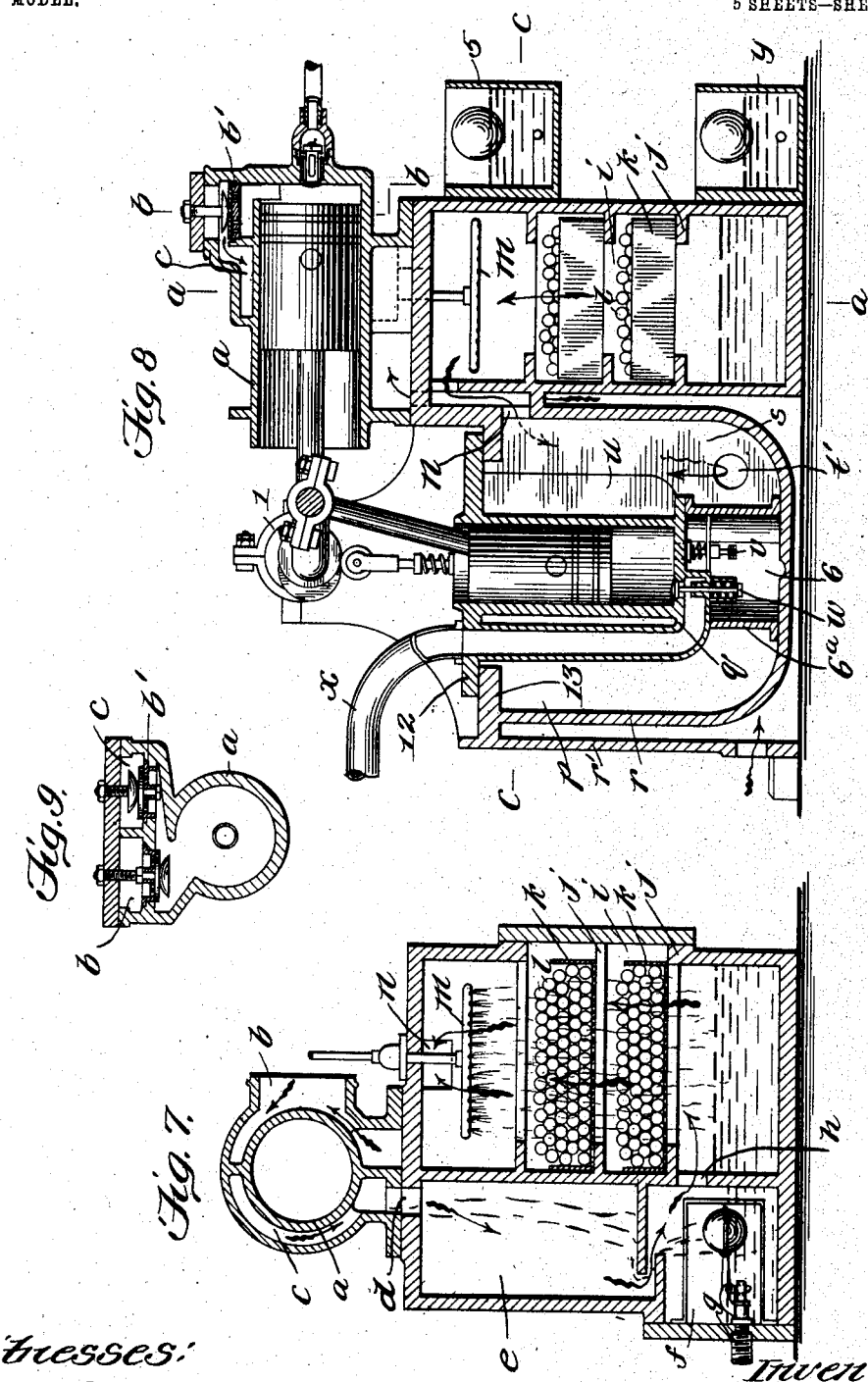

No. 761,448. PATENTED MAY 31, 1904.
T. & W. L. COLE.
E. A. COLE, EXECUTRIX OF T. COLE, DEC'D.
APPARATUS FOR PRODUCING COLD AIR FOR REFRIGERATING PURPOSES.
APPLICATION FILED JULY 22, 1901.
NO MODEL. 5 SHEETS—SHEET 5.

Witnesses
C. D. Hesler.
N. L. Bogan.

Inventors
Thomas Cole
William L. Cole
By
James L. Norris.
Atty.

No. 761,448. Patented May 31, 1904.

UNITED STATES PATENT OFFICE.

THOMAS COLE AND WILLIAM LAWES COLE, OF LONDON, ENGLAND; ELIZABETH ANN COLE EXECUTRIX OF SAID THOMAS COLE, DECEASED.

APPARATUS FOR PRODUCING COLD AIR FOR REFRIGERATING PURPOSES.

SPECIFICATION forming part of Letters Patent No. 761,448, dated May 31, 1904.

Application filed July 22, 1901. Serial No. 69,283. (No model.)

*To all whom it may concern:*

Be it known that we, THOMAS COLE and WILLIAM LAWES COLE, subjects of the King of Great Britain, residing at Park Road Iron Works, St. Ann's Road, Burdett Road, Bow, London, England, have invented certain new and useful Improvements in Apparatus for Producing Cold Air for Refrigerating Purposes, of which the following is a specification.

The invention relates to certain new and useful improvements in apparatus for producing cold air for refrigerating purposes, and aims to provide an apparatus of this class which shall be comparatively simple in its construction, strong, durable, efficient in its operation, and comparatively inexpensive to set up; and to this end it consists of the novel combination and arrangement of parts hereinafter fully described, illustrated in the accompanying drawings, and particularly pointed out in the claims hereunto appended.

In describing the invention in detail reference is had to the accompanying drawings, forming a part of this specification, wherein like reference characters indicate corresponding parts throughout the several views, and in which—

Figure 1 is a part sectional elevation of a complete machine. Fig. 2 is a section through the line 1 1 of Fig. 1. Fig. 3 is a plan of a complete machine. Fig. 4 is a plan of the casing with the compressor, expansion-cylinder, and operating mechanism therefor removed. Fig. 5 is an end elevation of a complete machine. Fig. 6 is an enlarged sectional view of the expansion-cylinder. Fig. 7 is a section on the line $a\,a$ of Fig. 8. Fig. 8 is a sectional elevation of the entire apparatus. Fig. 9 is a section on the line $b\,b$ of Fig. 8, and Fig. 10 is a sectional plan on the line $c\,c$ of Fig. 8.

Referring to the drawings by reference characters, $a$ denotes the compression-cylinder, in which the air to be compressed is admitted at $b$. During the compression of the air in the cylinder $a$ a spray of water is injected therein to mix with the air and absorb the heat of compression. The means for supplying the spray of water to the compression-cylinder $a$ will be hereinafter described. The compression-cylinder $a$ is further provided with an outlet-valve $b'$, which, after the compression of the air has taken place to a certain degree, opens or is opened and the compressed air and the water expelled from the cylinder $a$ by its piston through the passage $c$. The air and water then pass through the opening $d$, which communicates with the passage $c$ into the compartment $e$ of the cooling-chamber.

During the passage of the water and air through the compartment $e$ the water disassociates itself from the air by reason of its greater specific gravity and falls into the trap $f$, arranged at the bottom of the compartment $e$. The water flows away from the trap $f$ through the waste-pipe $g$, and the air passes from the compartment $e$ through the opening $h$ into the other compartment, $i$, of the cooling-chamber. The latter is provided with a series of shelves $j$, supporting a series of perforated or gauze plates or wire-work baskets $k$, in which are arranged spheres or other obstructive media $l$, acting as a cooling-surface. The spheres $l$ have water sprayed upon them from the pipe $m$, situated at the top of the compartment $i$. The air in passing up through compartment $i$ comes in contact with the spray of water and assisted by this and having to percolate in fine streams becomes cooled before passing from the compartment $i$ through the opening $n$ into the moisture-collecting chamber $p$, which is formed between the expansion-cylinder $q$ and an auxiliary casing $r$, substantially cup-shaped, which forms a well. The auxiliary casing $r$ is preferably cast integral with the casing $r'$ of the machine. As before stated, the auxiliary casing $r$ is preferably formed integral with the casing $r'$ of the machine and carries fins which extend toward the expansion-cylinder $q$, these fins forming a series of division-plates $s\,s'$, the former having an opening $t'$ and the latter having an opening $t$, these openings arranged alternately at top and bottom, so that the air can travel circuitously up and down and around the expansion-cylinder $q$ to deposit all its moisture upon the walls of the well and the walls and webs or fins $u$ of the expansion-cylinder $q$ before it enters the said cylinder $q$ by means of the valve $v$ to be expanded and further cooled. After the air is further cooled in the expansion-cylinder $q$ it is then expelled by the opening of the valve $w$ and fed by the pipe $x$ to the cold room or reservoir.

The fins of the auxiliary casing $r$ are constructed in such a manner that some of them extend from top to bottom, and the others extend from the top to a short distance from the bottom of the well. The wall $6^a$ forms a chamber 6 for entry of air to the expansion-cylinder, or in some cases the wall may be a continuation of the expansion-cylinder. The fins of the well $r$ correspond with certain fins or webs of the expansion-cylinder (see Fig. 10) and form the partitions $s$ before referred to, so that on the air entering the expansion-chamber it will travel up and down between the partitions alternately and around the expansion-cylinder until it reaches the chamber 6 for admission into the expansion-cylinder, the travel of the air being insured by the openings $t$ and $t'$ in the partitions. The partitions $s$ extend from top to bottom of the well, so as to cause the air to travel around the cylinder in one direction.

The water sprayed in the compression-cylinder is drawn from a float-controlled supply-tank $y$ by the pump $z$, actuated by an eccentric 1 on the main shaft 2, the water being drawn to one side of the piston on the one stroke and forced into the compression-cylinder on the return stroke through the pipe 3, the compression-cylinder being provided with a suitable sprayer, (not shown,) so that the water enters in spray form. The other end of the pump-piston is connected by the pipe 4 with a tank 5, from which the water is drawn and forced into the cooling-chamber $i$ by pipe $m$, so that as the pump-piston is actuated it alternately forces water into the compression-cylinder $a$ and cooling-compartment 1, the action being in unison with the strokes of the piston of the compression-cylinder. The water falling to the bottom of the cooling-compartment $i$ is discharged by the pressure of air in the compartment $i$ into the tank $y$, and the water is of such a quantity that the tank $y$ is always kept full, any overflow passing into the compartment $e$ and away by the waste-pipe $g$. The water-trap in the compartment $e$ is preferably controlled by a float and valve, as in existing machines; but any construction of trap may be employed.

The wall $6^a$ of central recess or chamber 6 encircles the valve $v$ and casing of the valve $w$ of the expansion-cylinder and also connects the last partition-space with the valve $v$, so that the air after having traveled around the expansion-cylinder will enter the chamber 6 to pass through the valve $v$ to the expansion-cylinder.

10 is a pipe having a cock 11 for drawing off the condensed moisture accumulated between the wall $6^a$ and the wall of the well, one of the partitions $s'$ being provided with a small opening at the bottom, so that the pipe 10 can draw off the whole of the water in the chamber, the opening making no difference to the travel of the air.

$10^a$ denotes a pipe having a cock $11^b$ for drawing the condensed moisture from the central recess 6.

The expansion-cylinder, in addition to being provided with webs, also has a flange 12, so that it can rest upon the bead 13 of the auxiliary casing $r$ and be secured thereto. The inlet-valve $v$ and exhaust-valve $w$ of the expansion-cylinder $q$ are operated, through rocking levers 13 and 14, by spring-controlled rods 15 and 16, actuated by cams 17 and 18 on the main shaft 2.

In some cases the chamber 19, surrounding the well, may be in connection with the cold room by a pipe at the opening 20 and through to the compression-cylinder by the opening 21, so that a complete circulation of the cold air takes place and greater efficiency is insured by reason of the cold air from the cold room extending its influence to the walls of the auxiliary casing $r$ and so assisting in cooling the air as is it traveling around the expansion-cylinder; but should this course not be adopted the moisture-collecting chamber $p$ is properly lagged on the outside with heat-insulating material.

In some cases the fins on the wall of the well $r$ may be dispensed with, in which case the air would travel about the fins $u$ of expansion-cylinder $q$ to deposit its moisture before passing to the expansion-cylinder $q$.

The machine is constructed with a compression-cylinder $a$, a double-compartment cooling-chamber, and an expansion-cylinder 9, these being arranged in relation to each other as shown; but the compression-cylinder and the expansion-cylinder can be arranged at a different angle to each other, but such that the pistons of both can be operated from one crank-shaft. The casing $r'$ of the machine is so formed that one portion is employed as the cooling-chamber and the other for containing the expansion-cylinder, the compression-cylinder being mounted above the cooling-chamber.

Having thus fully described our invention, what we claim as new, and desire to secure by Letters Patent, is—

1. In an apparatus for producing cold air, a cooling-chamber comprising two compartments, means for cooling the air arranged in one of the said compartments, an air-compressor, means for establishing communication between the said compressor and the other of said compartments, an expansion-cylinder, outwardly-extending fins carried by the said expansion-cylinder, an auxiliary casing surrounding the expansion-cylinder and forming a moisture-collecting chamber, said moisture-collecting chamber in communication with the compartment of the cooling-chamber provided with a cooling means, fins carried by the wall of the well and extending to the fins of the cylinder for forming partitions in the moisture-collecting chamber, means for establishing communication between the moisture-collecting chamber and the expansion-cylinder, and means for delivering cold air from the said expansion-cylinder.

2. In an apparatus for producing cold air, the combination with an air-compressor and means for absorbing the heat of compression, of an expansion-cylinder provided with outwardly-extending fins, an auxiliary casing surrounding the said cylinder and forming a moisture-collecting chamber, fins carried by the wall of the well and extending toward the fins of the cylinder for forming partitions in the moisture-collecting chamber, said partitions provided with suitable openings, a wall arranged in the well and forming a chamber below the expansion-cylinder, said chamber in communication with the moisture-collecting chamber, means for establishing communication between the said chamber below the expansion-cylinder and the said cylinder for supplying air thereto, and means for delivering the cold air from the said expansion-cylinder.

In testimony whereof we have hereunto set our hands in presence of two subscribing witnesses.

THOMAS COLE.
WILLIAM LAWES COLE.

Witnesses:
  Wm. O. Brown,
  Hugh Hughes.